March 22, 1949.  O. K. UNRUH  2,464,907

WINCH CLUTCH

Filed March 1, 1946

Oliver K. Unruh

By Clarence A. O'Brien
and Harvey B. Jacobson
Attorneys

Patented Mar. 22, 1949

2,464,907

UNITED STATES PATENT OFFICE 2,464,907

WINCH CLUTCH

Oliver K. Unruh, McPherson, Kans., assignor of one-fourth to Leland B. Unruh, McPherson, Kans.

Application March 1, 1946, Serial No. 651,193

1 Claim. (Cl. 192—66)

This invention relates to new and useful improvements and structural refinements in clutches, more specifically friction clutches, and the principal object of the invention is to conceal the clutch surfaces within one of the clutch members in such manner as to protect said surfaces from particles of foreign matter which would otherwise injure the surfaces if they were exposed.

More particularly, the invention contemplates the provision of a clutch for winches, and the like, the clutch mechanism being built into and enclosed by the winch drum, whereby concealment and protection of the clutch surfaces is facilitated.

An important feature of the invention resides in its ability to provide relatively large clutch surfaces as compared to those in clutches of conventional types, these large surfaces presenting themselves by virtue of the usual, substantial dimensions of the winch drum.

Another important advantage of the invention lies in its simplicity of construction, ease and convenience of manipulation, and in its adaptability to expeditious inspection and maintenance.

With the above more important object and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
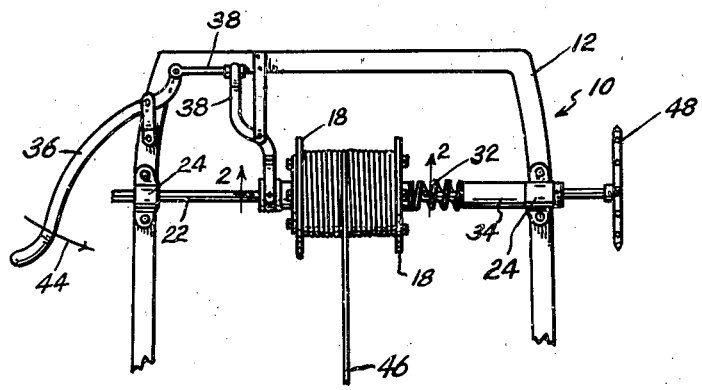
Figure 1 is an elevational view of a winch embodying the invention.
Figure 2:
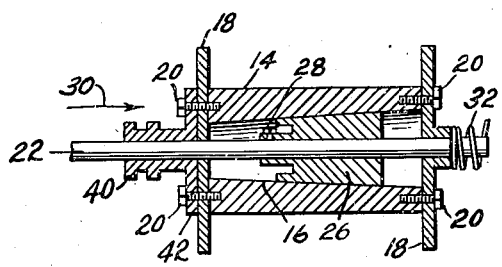
Figure 2 is a cross sectional view, taken substantially in the plane of the line 2—2 of Figure 1.

Referring now to the accompanying drawings in detail, the general reference character 10 designates a winch mounted upon a suitable framework 12 and including a cylindrical winding drum 14.

This drum is formed with an axial, frusto-conical bore 16 which extends from one end of the drum to the other, and a pair of circular plates 18 are secured by suitable screws 20 to the ends of the drum, the plates 18 constituting the drum flanges, as will be clearly apparent.

The plates 18 are provided with central openings and by virtue thereof the entire drum is rotatable and longitudinally shiftable upon a drive shaft 22 which, in turn, is rotatably journaled in suitable bearings 24 provided on the framework 12.

A frusto-conical clutch member 26 is disposed within the bore 16 of the drum 14 and is secured to the shaft 22 by means of a set screw 28, the member 26 being tapered complementarily to the bore 16 and being frictionally engageable therewith. Accordingly, it will be apparent from the foregoing that when the drum 14, together with the flanges or plates 18, is slid on the shaft 22 in the direction of the arrow 30, the member 26 will be brought in frictional engagement with the bore 16 and, as a result, the shaft 22, the member 26 and the drum 14 will be rotatable as a unit.

On the other hand, when the drum 14 is slid in a relatively opposite direction, the member 26 will be disengaged from the bore 16, and the drum 14 will be free to remain stationary notwithstanding rotation of the member 26 and shaft 22.

The drum 14 is normally urged to a disengaged position by means of a suitable compression spring 32 provided on the shaft 22 between one of the plates 18 and a sleeve 34 disposed on said shaft adjacent one of the bearings 24, as will be clearly apparent. However, the drum 14 may be slid in the direction of the arrow 30 into an engaged position by means of a suitable actuating lever 36 pivoted to the frame 12 and operatively connected through the medium of suitable linkage 38 to a circumferentilly grooved boss 40, the latter, in turn, being equipped with a mounting flange 42 secured to the remaining of the plates 18, substantially as shown. It will be apparent that by swinging the lever 36 in the direction of the arrow 44, the drum 14 will be slid on the shaft 22 in the direction of the arrow 30, thus bringing the member 26 in frictional engagement with the bore 16 of the drum.

A suitable cable 46 is windable upon the drum 14, and the shaft 22 may be driven in any desired manner, such as for example, by endless chain (not chown) engaging a sprocket 48 with which the shaft 22 may be provided.

It is believed that the advantages and use of the invention will be clearly apparent from the foregoing disclosure and accordingly, further description thereof at this point is deemed unnecessary.

What I claim as my invention is:

In a winch clutch, a longitudinally shiftable winding drum having a frusto-conical bore extending from one end thereof to the other, a drive shaft extending through said bore, a frusto-conical clutch member disposed in said bore and secured to said shaft, and a pair of end plates provided at the ends of said drum and constituting flanges thereof, said end plates being slidable and rotatable on said shaft and said clutch member being frictionally engageable with the bore of said drum.

OLIVER K. UNRUH.

REFERENCES CITED

The following references are of record in the file of this patent:

UNITED STATES PATENTS

| Number | Name | Date |
| --- | --- | --- |
| 305,417 | Borrenberg | Sept. 23, 1884 |
| 386,719 | Rhone | July 24, 1888 |
| 717,617 | Quella | Jan. 6, 1903 |
| 858,789 | Brachmann | July 2, 1907 |
| 910,368 | Ganong | Jan. 10, 1909 |
| 1,761,801 | Robb | June 3, 1930 |
| 1,933,924 | Nickerson | Nov. 7, 1933 |